United States Patent
Zhang et al.

(10) Patent No.: US 11,132,189 B2
(45) Date of Patent: Sep. 28, 2021

(54) FIRMWARE UPDATE DEVICE AND FIRMWARE UPDATE METHOD

(71) Applicant: Wistron Corporation, New Taipei (TW)

(72) Inventors: Zh-Wei Zhang, New Taipei (TW); Syu-Siang Lee, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 16/540,009

(22) Filed: Aug. 13, 2019

(65) Prior Publication Data
US 2020/0379745 A1    Dec. 3, 2020

(30) Foreign Application Priority Data
May 31, 2019 (TW) ................ 108118905

(51) Int. Cl.
*G06F 8/65* (2018.01)
*G06F 13/16* (2006.01)

(52) U.S. Cl.
CPC ............ *G06F 8/65* (2013.01); *G06F 13/1689* (2013.01)

(58) Field of Classification Search
CPC ................ G06F 8/65; G06F 13/1689
See application file for complete search history.

(56) References Cited

U.S. PATENT DOCUMENTS

| | | | | |
|---|---|---|---|---|
| 7,222,164 B1* | 5/2007 | Deh | ................ | G06Q 20/105 235/380 |
| 7,809,927 B2* | 10/2010 | Shi | ................ | H03L 7/1806 712/36 |
| 10,127,032 B2* | 11/2018 | Su | ................ | G06F 8/654 |

(Continued)

FOREIGN PATENT DOCUMENTS

| CN | 102455926 | | 5/2012 | |
|---|---|---|---|---|
| CN | 105793715 A | * | 7/2016 | ....... G01R 31/31703 |

(Continued)

OTHER PUBLICATIONS

Agrawal, "Design of High Speed I/O Interfaces for High Performance Microprocessors", Oct. 2010, Harvard University (Year: 2010).*

(Continued)

*Primary Examiner* — Wei Y Zhen
*Assistant Examiner* — Junchun Wu
(74) *Attorney, Agent, or Firm* — JCIPRNET

(57) ABSTRACT

A firmware update device and a firmware update method are provided. The firmware update device includes a first storage medium, a baseboard management controller (BMC), a retimer card, and a processor. The first storage medium stores firmware configuration data. The BMC is coupled to the first storage medium, wherein the BMC is configured to update the firmware configuration data. The retimer card stores a card identifier and firmware. The processor is coupled to the first storage medium and the BMC, wherein the processor detects the card identifier of the retimer card (Continued)

and update the firmware of the retimer card according to the firmware configuration data corresponding to the card identifier in response to identifying the card identifier after the retimer card is coupled to the processor.

9 Claims, 2 Drawing Sheets

(56) References Cited

U.S. PATENT DOCUMENTS

| | | | | |
|---|---|---|---|---|
| 2003/0158922 A1* | 8/2003 | Park | ............... | H04W 48/16 709/222 |
| 2006/0026340 A1* | 2/2006 | Ito | ............... | G11C 5/04 711/103 |
| 2006/0282653 A1* | 12/2006 | Chu | ............... | G06F 8/654 713/1 |
| 2007/0022179 A1* | 1/2007 | Kim | ............... | H04H 60/91 709/217 |
| 2007/0136031 A1* | 6/2007 | Feldman | ............... | G06F 30/00 703/1 |
| 2008/0028385 A1* | 1/2008 | Brown | ............... | G06F 8/65 717/170 |
| 2008/0162762 A1* | 7/2008 | Neiger | ............... | G06F 9/45533 710/261 |
| 2008/0178171 A1* | 7/2008 | Sueyoshi | ............... | G06F 8/65 717/171 |
| 2008/0235803 A1* | 9/2008 | Harada | ............... | G06F 21/57 726/26 |
| 2010/0169884 A1* | 7/2010 | Bogin | ............... | G06F 9/45533 718/1 |
| 2012/0036507 A1* | 2/2012 | Jonnala | ............... | G06F 8/60 717/178 |
| 2012/0185634 A1* | 7/2012 | Shirai | ............... | G06F 13/385 710/316 |
| 2014/0149631 A1* | 5/2014 | Kim | ............... | G06F 13/4022 710/316 |
| 2015/0149660 A1* | 5/2015 | Huang | ............... | G06F 13/385 710/3 |
| 2015/0293770 A1* | 10/2015 | Orii | ............... | G06F 9/44536 710/9 |
| 2016/0377679 A1* | 12/2016 | Froelich | ............... | G01R 31/31703 714/735 |
| 2017/0005441 A1* | 1/2017 | Tsai | ............... | G06F 8/65 |
| 2017/0010874 A1* | 1/2017 | Rosset | ............... | H04L 67/34 |
| 2018/0210851 A1* | 7/2018 | Hu | ............... | G06F 13/4022 |
| 2019/0095195 A1* | 3/2019 | Lin | ............... | G06F 9/4406 |
| 2020/0097431 A1* | 3/2020 | Wang | ............... | H05K 7/20727 |
| 2020/0379745 A1* | 12/2020 | Zhang | ............... | G06F 13/1689 |

FOREIGN PATENT DOCUMENTS

| | | | |
|---|---|---|---|
| CN | 107153561 A | * | 9/2017 |
| CN | 208314763 U | * | 1/2019 |
| TW | 201222413 | | 6/2012 |

OTHER PUBLICATIONS

Li et al. "Digital forensics and analysis for Android devices", 2016, IEEE (Year: 2016).*

Saligram et al., "Establishing EtherCAT Communication between Industrial PC and Variable Frequency Drive", 2018, IEEE (Year: 2018).*

Yang et al., "New acquisition method based on firmware update protocols for Android smartphones", 2015, Elsevier Ltd (Year: 2015).*

"Office Action of Taiwan Counterpart Application", dated May 21, 2020, p. 1-p. 8.

* cited by examiner

FIRMWARE UPDATE DEVICE AND FIRMWARE UPDATE METHOD

CROSS-REFERENCE TO RELATED APPLICATION

This application claims the priority benefit of Taiwan application serial no. 108118905, filed on May 31, 2019. The entirety of the above-mentioned patent application is hereby incorporated by reference herein and made a part of this specification.

BACKGROUND

Technical Field

The invention relates to a firmware update device and a firmware update method.

Description of Related Art

Peripheral Component Interconnect Express (PCIe) expander may have a plurality of PCIe slots, where each of the PCIe slots may be inserted with a PCIe retimer card. The PCIe expander may be communicatively connected with a plurality of different devices through the PCIe retimer cards, so as to allow control signals used for driving the devices to be transmitted to the devices. When cable lengths between the PCIe expander and the connected devices are different, firmware of the PCIe retimer cards is required to be updated to accommodate different transmission distances. Therefore, the PCIe retimer cards need to be configured with a plurality of Electrically-Erasable Programmable Read-Only Memories (EEPROMs) to store firmware corresponding to different cables.

On the other hand, a Baseboard Management Controller (BMC) has a function of remotely updating the firmware of the PCIe retimer card. When the BMC is used for managing a more complex system, it often takes 2 to 5 minutes to start the BMC due to a large capacity of program codes. The system managed by the BMC will not start until the BMC is started. Otherwise, the system may be unable to communicatively connect with the PCIe expander because it misses a PCI bus signal of the PCIe expander. However, to wait for the BMC to start may waste a lot of time.

SUMMARY

The invention is directed to a firmware update device and a firmware update method, which are adapted to reduce the number of storage media configured to a retimer card. Even if a system/device connected to a firmware update device is started without waiting for start of a Baseboard Management Controller (BMC), the retimer card may still complete updating firmware corresponding to the system/device.

The invention provides a firmware update device including a first storage medium, a BMC, a retimer card, and a processor. The first storage medium stores firmware configuration data. The BMC is coupled to the first storage medium, wherein the BMC is configured to update the firmware configuration data. The retimer card stores a card identifier and firmware. The processor is coupled to the first storage medium and the BMC, wherein after the retimer card is coupled to the processor, the processor detects the card identifier of the retimer card and updates the firmware of the retimer card according to the firmware configuration data corresponding to the card identifier in response to identifying the card identifier.

In an embodiment of the invention, the retimer card includes a retimer, a second storage medium and a third storage medium. The second storage medium is coupled to the retimer, wherein the second storage medium stores the firmware. The third storage medium stores the card identifier.

In an embodiment of the invention, the retimer card further includes a cable port, wherein the cable port is connected to a cable. The processor detects a cable identifier of the cable, and updates the firmware of the retimer card according to the firmware configuration data corresponding to the card identifier and the cable identifier in response to identifying the card identifier and the cable identifier.

In an embodiment of the invention, the BMC transmits a first notification message to the processor in response to updating the firmware configuration data.

In an embodiment of the invention, the processor transmits a second notification message to the BMC in response to reading the firmware configuration data.

In an embodiment of the invention, the processor determines to update the firmware of the retimer card in response to initial use of the retimer card.

In an embodiment of the invention, the processor determines to update the firmware of the retimer card in response to a variation of the cable identifier.

In an embodiment of the invention, the processor determines to update the firmware of the retimer card in response to receiving the first notification message.

In an embodiment of the invention, the processor determines a length corresponding to the cable according to the cable identifier, and updates the firmware of the retimer card according to the length corresponding to the cable.

Based on the above description, the firmware update device of the invention may dynamically update the firmware of the retimer card, such that the retimer card may support any type of the cable connected to the retimer card.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
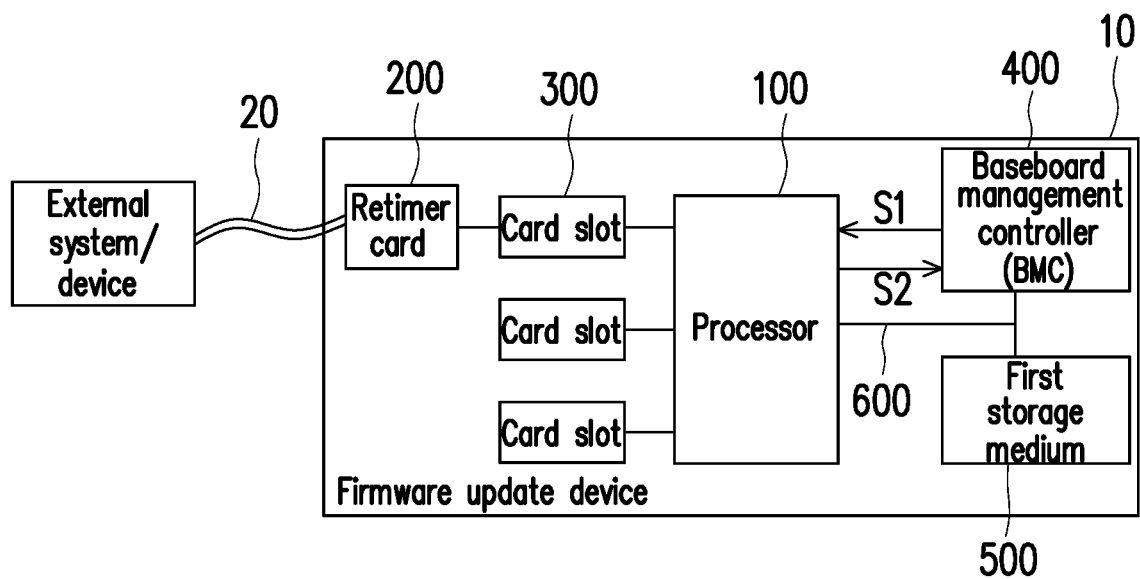
FIG. 1 is a schematic diagram of a firmware update device and a cable connected thereto according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic diagram of a firmware update device 10 and a cable 20 connected thereto according to an embodiment of the invention. The firmware update device 10 is, for example, an expander having a plurality of card slots 300, but the invention is not limited thereto. The firmware update device 10 includes a processor 100, a retimer card 200, card slots 300, a Baseboard Management Controller (BMC) 400 and a first storage medium 500. The retimer card 200 of the firmware update device 10 may be coupled to the cable 20, and communicatively connected with an external system/device through the cable 20.

The processor 100 is, for example, a Complex Programmable Logic Device (CPLD) or a Field Programmable Gate Array (FPGA), but the invention is not limited thereto. For example, the processor 100 may also be a Central Processing Unit (CPU), or other programmable general purpose or special purpose Micro Control Unit (MCU), a microprocessor, a Digital Signal Processor (DSP), a programmable controller, an Application Specific Integrated Circuit (ASIC), a Graphics Processing Unit (GPU), an Arithmetic Logic Unit (ALU) or other similar device or a combination of the above devices. The processor 100 is configured to process digital signals and execute a firmware update method provided by the embodiment of the invention. The processor 100 is coupled to the card slots 300, the BMC 400 and the first storage medium 500. When the retimer card 200 is inserted in the card slot 300, the processor 100 is coupled to the retimer card 200 through the card slot 300.

The card slot 300 is, for example, a PCIe slot supporting a PCIe bus, but the invention is not limited thereto. The retimer card 200 may be communicatively connected with the processor 100 through the card slot 300.

The first storage medium 500 is, for example, an EEPROM, but the invention is not limited thereto. For example, the first storage medium 500 may also be a Random Access Memory (RAM), a Read-Only Memory (ROM), a flash memory, a Hard Disk Drive (HDD), a Solid State Drive (SSD) or a similar device or a combination of the above devices. The first storage medium 500 stores a plurality of firmware configuration data used for updating firmware of the retimer card 200, where the plurality of firmware configuration data respectively correspond to different retimer cards or different cables. The first storage medium 500 is coupled to the processor 100 and the BMC 400, and communicates with the processor 100 or the BMC 400 through an I2C bus 600.

The BMC 400 is configured to update firmware of the external system/device. To be specific, the BMC 400 may be configured to update the firmware configuration data stored in the first storage medium 500. After the BMC 400 completes updating the firmware configuration data, the processor 100 may access the updated firmware configuration data, and update the firmware of the retimer card 200 according to the updated firmware configuration data.

Figure 2:
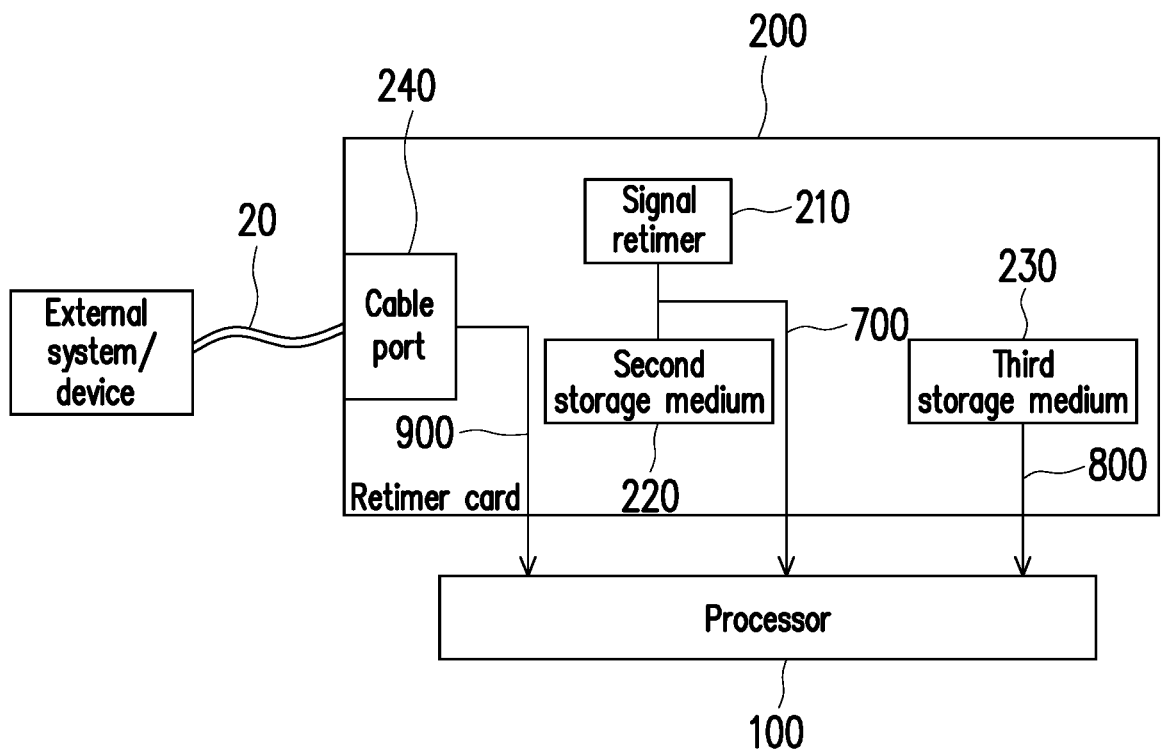
FIG. 2 is a schematic diagram of a retimer card according to an embodiment of the invention.

FIG. 2 is a schematic diagram of the retimer card 200 according to an embodiment of the invention. The retimer card 200 includes a retimer 210, a second storage medium 220, a third storage medium 230 and a cable port 240.

The retimer 210 may generate a clock reconstruction signal to increase a strength of the signal passing through the retimer card 200. To be specific, the retimer 210 may access the firmware stored in the second storage medium 220, and generates the corresponding clock reconstruction signal according to the firmware. When the retimer card 200 is inserted to the card slot 300, the retimer 210 is communicatively connected with the processor 100 through the I2C bus 700.

The second storage medium 220 and the third storage medium 230 are, for example, EEPROMs, but the invention is not limited thereto. For example, the second storage medium 220 and the third storage medium 230 may also be Random Access Memories (RAMs), Read-Only Memories (ROMs), flash memories, hard disks, Solid State Disks (SSDs) or similar devices or a combination of the above devices. The second storage medium 220 is coupled to the retimer 210, and stores the firmware used for driving signals in the cable 20. The third storage medium 230 stores a card identifier corresponding to the retimer card 200. When the retimer card 200 is inserted to the card slot 300, the second storage medium 220 is communicatively connected with the processor 100 through the I2C bus 700, and the third storage medium 230 is communicatively connected with the processor 100 through a reserved pin 800.

The cable port 240 is coupled to the cable 20. When the retimer card 200 is inserted to the card slot 300, the cable 20 is communicatively connected with the processor 100 through a reserved pin 900. A length of the cable 20 may be varied, so that in order to keep the signals transmitted to external system/device unchanged, the retimer card 200 requires to use different firmware to support the cable 20 of a different length. In other words, when the cable 20 is varied, the firmware in the second storage medium 220 of the retimer card 200 is required to be dynamically updated to support the new cable 20.

Referring to FIG. 1 and FIG. 2, after the retimer card 200 is inserted to the card slot 300 and coupled to the processor 100, the processor 100 may detect the card identifier stored in the third storage medium 230 of the retimer card 200, and read the firmware configuration data corresponding to the card identifier from the first storage medium 500 in response to identifying the card identifier. Then, the processor 100 may update the firmware stored in the second storage medium 220 of the retimer card 200 according to the firmware configuration data. In other words, the processor 100 may select the proper firmware configuration data for the different card identifier.

In an embodiment, the type of the cable 20 may also affect the firmware configuration data selected by the processor 100. After the retimer card 200 is inserted to the card slot 300 and coupled to the processor 100, the processor 100 may detect the card identifier of the retimer card 200 and detect a cable identifier of the cable 20. The processor 100 may read the firmware configuration data corresponding to the card identifier and the cable identifier from the first storage medium 500 in response to identifying the card identifier of the retimer card 200 and detecting the cable identifier of the cable 20. To be specific, the processor 100 may determine a length corresponding to the cable 20 according to the cable identifier, so as to select the firmware configuration data corresponding to the length according to the length. Then, the processor 100 may update the firmware stored in the second storage medium 220 of the retimer card 200 according to the firmware configuration data.

When the BMC 400 updates the firmware configuration data in the first storage medium 500 through the I2C bus 600, the BMC 400 may transmit a first notification message S1 to the processor 100 through, for example, a General Purpose Input/Output (GPIO) channel, so as to indicate the processor 100 that the I2C bus 600 is being occupied. The processor 100 then pauses reading the firmware configuration data in the first storage medium 500. On the other hand, when the processor 100 reads the firmware configuration data from the first storage medium 500 through the I2C bus 600, the processor 100 may transmit a second notification message S2 to the processor 100 through, for example, the GPIO channel, so as to indicate the BMC 400 that the I2C bus 600 is being occupied. The BMC 400 then pauses updating the firmware configuration data in the first storage medium 500.

When a specific event occurs, the processor 100 may determine to update the firmware of the retimer card 200. In an embodiment, after the processor 100 receives the first notification message S1 from the BMC 400 through the I2C bus 600, the processor 100 learns that the BMC 400 is updating the firmware configuration data in the first storage medium 500. Therefore, the processor 100 may determine to update the firmware of the retimer card 200 in response to receiving the first notification message S1. The processor 100 does not access the first storage medium 500 through the I2C bus 600 when the I2C bus 600 is occupied, but starts to update the firmware of the retimer card 200 after the BMC 400 completes updating the firmware configuration data.

In an embodiment, after the processor 100 detects the card identifier of the retimer card 200, the processor 100 may determine that the retimer card 200 has not been used (or the firmware of the retimer card 200 has not been updated) according to the card identifier. Therefore, the processor 100 may determine to update the firmware of the retimer card 200 in response to an initial use of the retimer card 200.

In an embodiment, after the cable 20 connected to the retimer card 200 is varied, the processor 100 may detect the cable identifier of the varied cable 20, and determine to update the firmware of the retimer card 200 in response to variation of the cable identifier.

Figure 3:
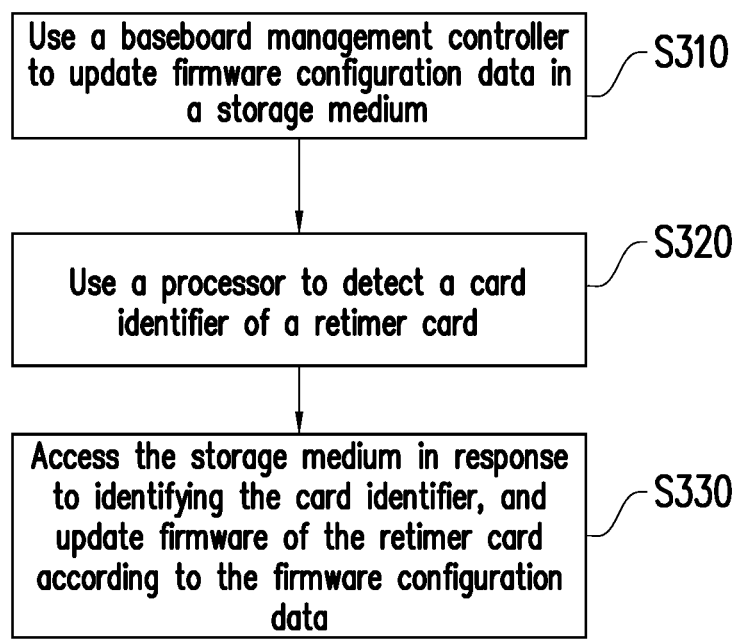
FIG. 3 is a flowchart illustrating a firmware update method according to an embodiment of the invention.

FIG. 3 is a flowchart illustrating a firmware update method according to an embodiment of the invention. The firmware update method may be implemented by the firmware update device 10 of FIG. 1. In a step S310, a BMC is used to update firmware configuration data in a storage medium. In a step S320, a processor is used to detect a card identifier of a retimer card. In a step S330, the storage medium is accessed in response to identifying the card identifier, and the firmware of the retimer card is updated according to the firmware configuration data.

In summary, the firmware update device of the invention may dynamically update the firmware of the retimer card, such that the retimer card may support any type of the cable connected to the retimer card. Compared to the conventional method of using the BMC to update the firmware of the retimer card, in the invention, the processor different to the BMC is used to update the firmware of the retimer card. Therefore, even if the system/device connected to the firmware update device is started earlier than the BMC, the system/device will not be unable to communicatively connect with the firmware update device because that the signal it sent at startup is not received by the BMC. On the other hand, the processor may select proper firmware configuration data from a plurality of firmware configuration data in the storage medium. Therefore, the invention only needs a single storage medium to store various firmware configuration data. In other words, the number of the storage media used for storing the various firmware configuration data may be reduced.

The elements, actions or instructions in the detailed description of the disclosed embodiments of the invention should not be construed as being critical or essential to the invention unless explicitly described. Moreover, as used herein, an indefinite article "a" may be used to include more than one item. If it is intended to refer to only one item, a term "single" or similar language will be used. Moreover, as used herein, a term "any one" before a list of multiple items and/or multiple item categories is intended to include the items and/or item categories described individually or in combination with other items and/or other item categories "any one", "any combination of", "any of the plurality" and/or "any combination of the plurality". Moreover, as used herein, a term "set" is intended to contain any number of items, including zero. In addition, as used in herein, the term "number" is intended to contain any number, including zero.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. A firmware update device, comprising:
   a first storage medium, storing firmware configuration data;
   a baseboard management controller, coupled to the first storage medium, wherein the baseboard management controller is configured to update the firmware configuration data;
   a retimer card, storing a card identifier and firmware, wherein the retimer card is detachably coupled to a cable having a retimer cable identifier; and
   a processor, coupled to the first storage medium and the baseboard management controller, wherein in response to that the cable having the retimer cable identifier is coupled to the retimer card and the retimer card is coupled to the processor, the processor detects the retimer cable identifier and the card identifier of the retimer card,
   wherein the processor selects the firmware configuration data corresponding to both the card identifier of the retimer card and the retimer cable identifier for updating the firmware of the retimer card,
   wherein the retimer card comprises:
      a retimer;
      a second storage medium, coupled to the retimer, wherein the second storage medium of the retimer card stores the firmware of the retimer card; and
      a third storage medium, wherein the third storage medium of the retimer card stores the card identifier of the retimer card.

2. The firmware update device as claimed in claim 1, wherein
   the retimer card further comprises a cable port, wherein the cable port is connected to the cable; and
   the processor updates the firmware of the retimer card according to the firmware configuration data corresponding to the card identifier and the retimer cable identifier in response to identifying the card identifier and the retimer cable identifier.

3. The firmware update device as claimed in claim 1, wherein the baseboard management controller transmits a first notification message to the processor in response to updating the firmware configuration data.

4. The firmware update device as claimed in claim 1, wherein the processor transmits a second notification message to the baseboard management controller in response to reading the firmware configuration data.

5. The firmware update device as claimed in claim 1, wherein the processor determines to update the firmware of the retimer card in response to initial use of the retimer card.

6. The firmware update device as claimed in claim 2, wherein the processor determines to update the firmware of the retimer card in response to a variation of the cable identifier.

7. The firmware update device as claimed in claim 3, wherein the processor determines to update the firmware of the retimer card in response to receiving the first notification message.

8. The firmware update device as claimed in claim 2, wherein the processor determines a length corresponding to the cable according to the cable identifier, and updates the firmware of the retimer card according to the length corresponding to the cable.

9. A firmware update method, comprising:
- using a baseboard management controller to update firmware configuration data in a first storage medium;
- providing a retimer card, wherein the retimer card is detachably coupled to a cable having a retimer cable identifier, and the retimer card comprises a retimer, a second storage medium coupled to the retimer, and a third storage medium,
- using the second storage medium of the retimer card to store firmware of the retimer card;
- using the third storage medium of the retimer card to store a card identifier of the retimer card,
- using a processor to detect the card identifier of the retimer card and the retimer cable identifier; and
- selecting the firmware configuration data corresponding to both the card identifier of the retimer card and the retimer cable identifier by accessing the first storage medium, and updating the firmware of the retimer card according to the firmware configuration data.

* * * * *